Sept. 17, 1957 H. L. BOWDITCH 2,806,480
DIFFERENTIAL PRESSURE RESPONSIVE APPARATUS
Filed Sept. 1, 1954 4 Sheets-Sheet 1
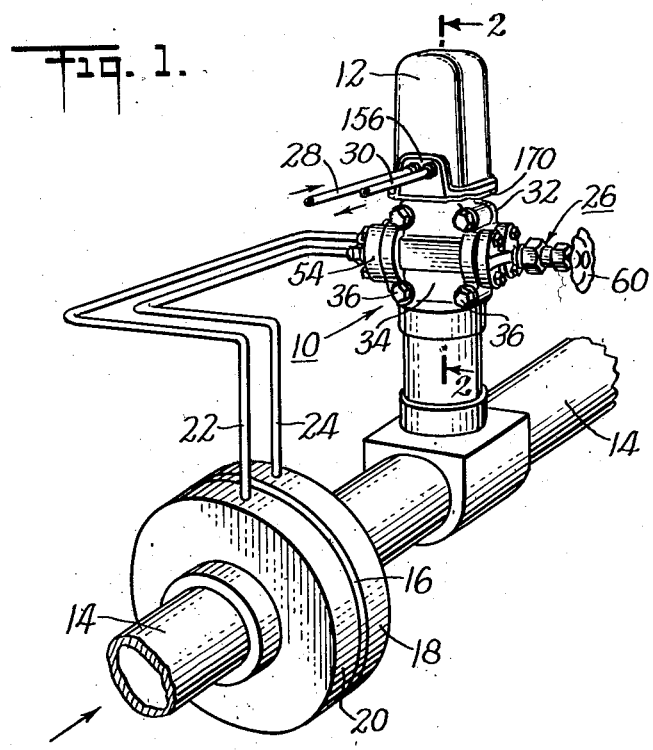
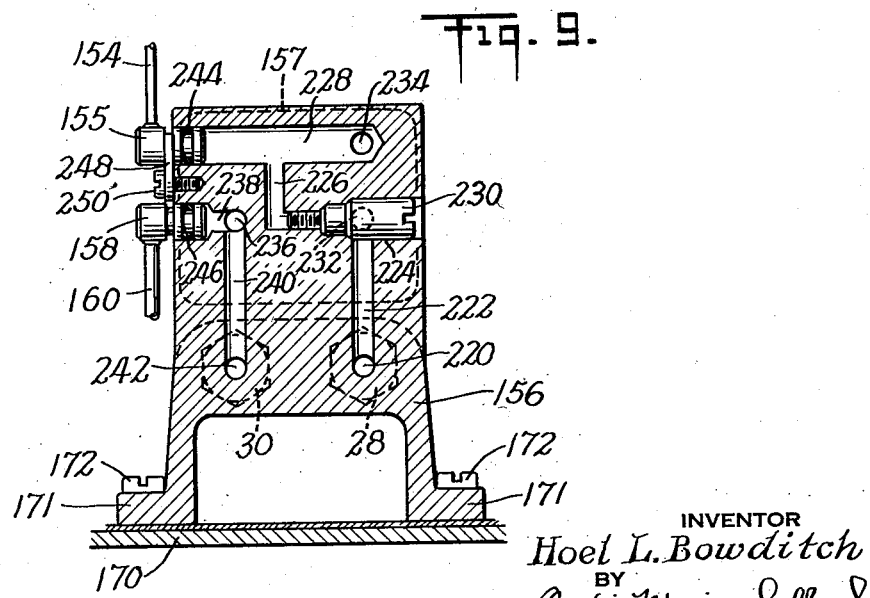
INVENTOR
Hoel L. Bowditch
BY
Curtis, Morris + Safford
ATTORNEYS Sept. 17, 1957  H. L. BOWDITCH  2,806,480
DIFFERENTIAL PRESSURE RESPONSIVE APPARATUS
Filed Sept. 1, 1954  4 Sheets-Sheet 2

INVENTOR
Hoel L. Bowditch
BY
Curtis, Morris + Safford
ATTORNEYS

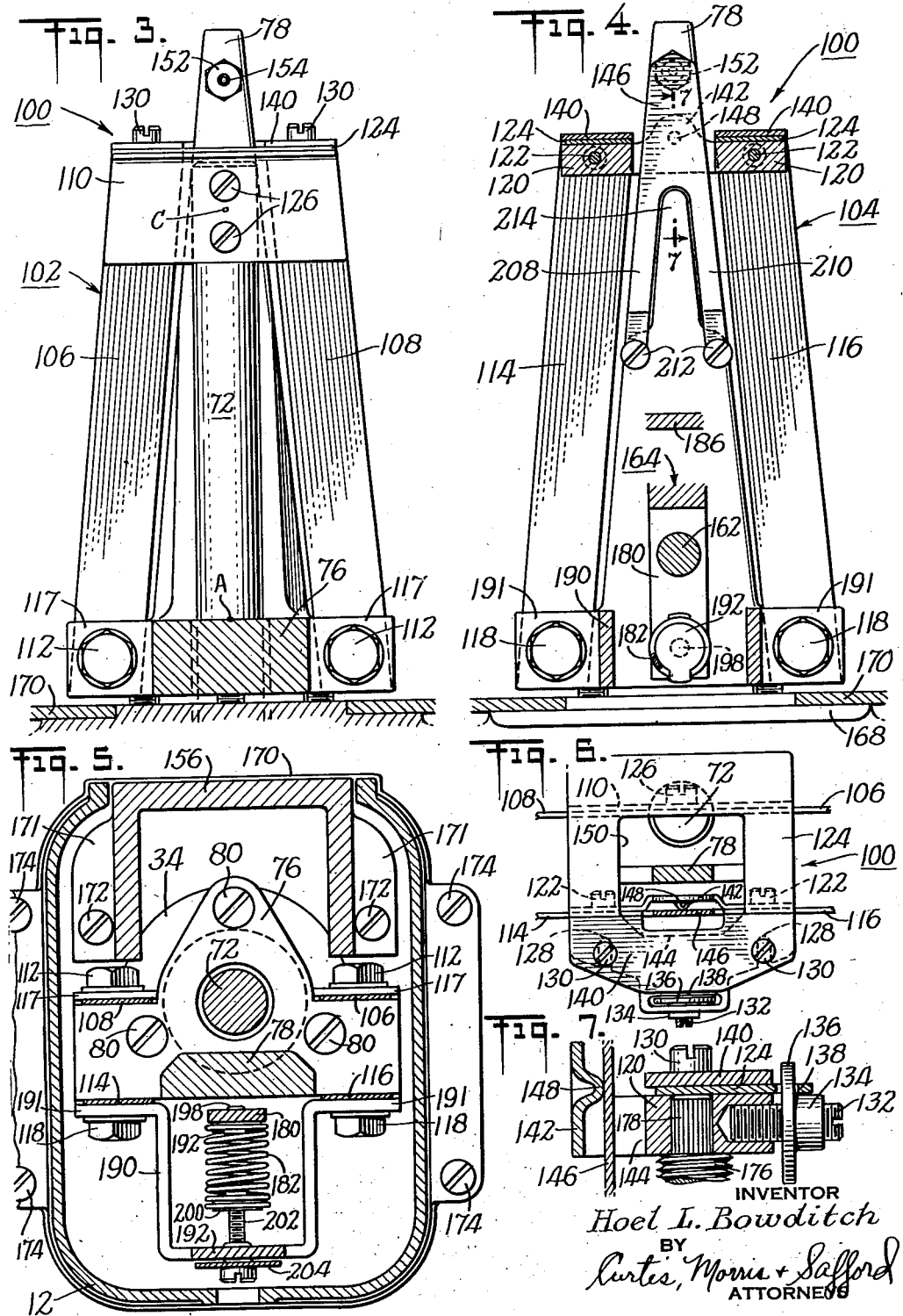

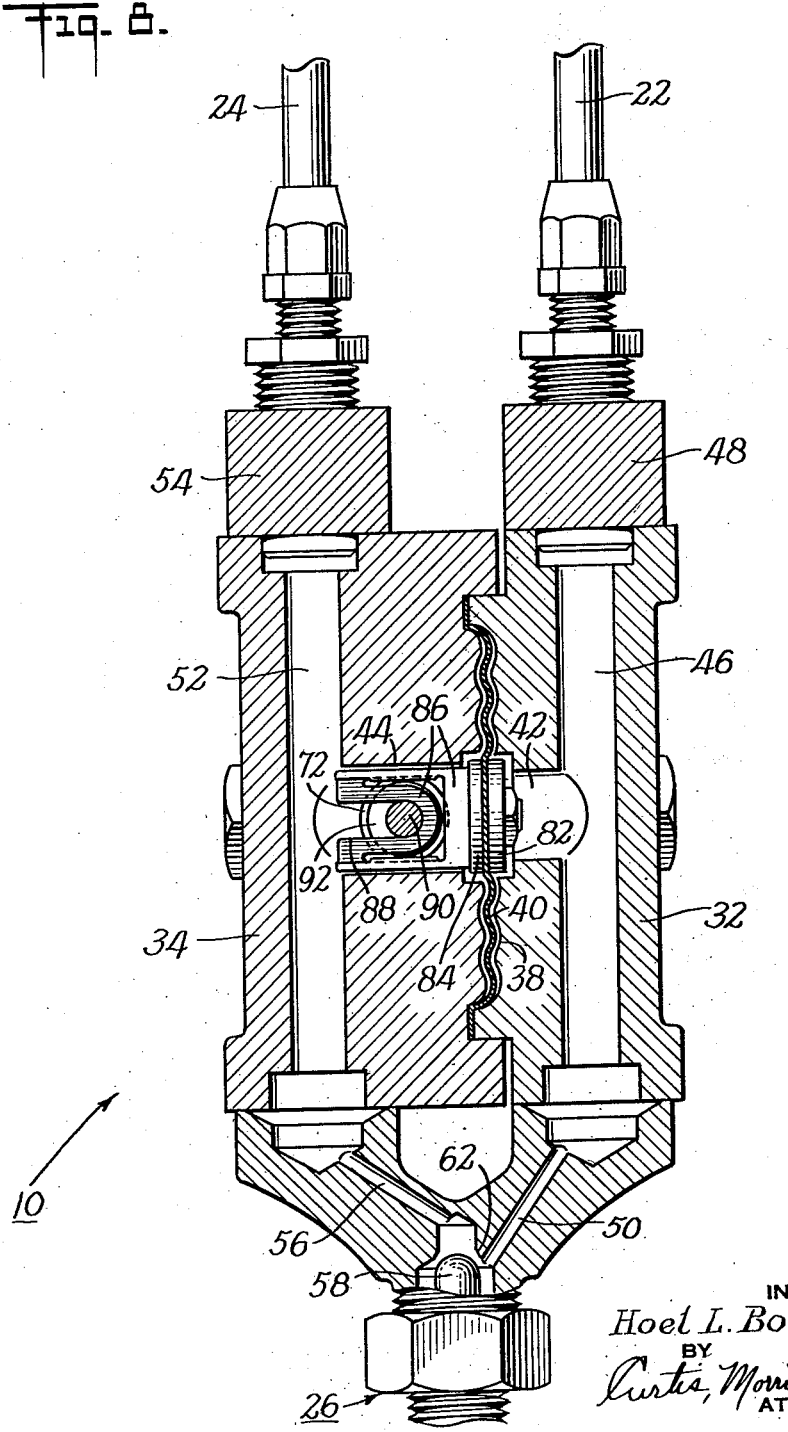

United States Patent Office 2,806,480
Patented Sept. 17, 1957

2,806,480

DIFFERENTIAL PRESSURE RESPONSIVE APPARATUS

Hoel L. Bowditch, Foxboro, Mass., assignor to The Foxboro Company, Foxboro, Mass., a corporation of Massachusetts Application September 1, 1954, Serial No. 453,632

18 Claims. (Cl. 137—85)

This invention relates to the measurement of differential pressures and more particularly to a novel apparatus for measuring differential pressures and converting them into corresponding pneumatic pressure values that may be used to operate a suitable device for indicating, recording and/or controlling the measured differential pressure.

While differential pressure measuring devices have a variety of uses, they are perhaps most extensively used for the measurement of fluid flow and hence the device of the present invention will be illustratively described herein as employed for making such a fluid flow measurement. For this application the differential pressure responsive device is made responsive to the differential pressure across an orifice that is inserted in the pipe through which the fluid flows and the measure differential pressure provides an indication of the volume of fluid flowing through the pipe. One type of measuring device that has been used for this purpose comprises a resilient diaphragm mounted in a sealed casing with its opposite sides exposed to the pressures upstream and downstream of the orifice so that the diaphragm is deflected an amount representative of the magnitude of the differential pressure across the orifice. Movement of or force on the diaphragm is mechanically transmitted through the wall of the casing and translated, for example, into corresponding pneumatic pressure values that can be used to actuate a suitable indicating, recording or controlling instrument which may in some cases be located a considerable distance away from the measuring device. A differential pressure measuring apparatus of this general type is disclosed in Cook Patent 2,539,892.

In its preferred embodiment, the structure of the present invention resembles the Cook structure with respect to its general principle of operation, although as the description proceeds it will become apparent that the present device incorporates a number of important and patentably significant improvements. More specifically, the present device, like the Cook device, is preferably a so-called "force-balance" instrument. A force transmitting lever or force bar extends through the casing wall and is mounted for pivoting movement therein. The internal end of the force bar is connected to the differential responsive diaphragm within the casing, and a pneumatic balancing system is provided externally of the casing that exerts on the external portion of the force bar a force that continuously balances the force exerted on the opposite end of the force bar by the differential responsive diaphragm. As an incident of this balancing operation a pneumatic pressure is developed in the pneumatic system which ideally is proportional to the differential pressure that is being measured.

The pneumatic system includes a pneumatic baffle-nozzle assembly which is known to have a normal operating range of less than 0.001 inch. The external end of the force bar is so connected to the baffle-nozzle assembly, that the normal range of movement of the force bar is of the same order of magnitude as the operating range of the baffle-nozzle. Thus although some pivoting movement of the force bar necessarily occurs in the operation of the instrument, the amount of such movement during normal operation is extremely small.

Although the principle of operation of such a device is quite simple, numerous practical difficulties are encountered when an attempt is made to build an instrument embodying this principle that is capable of producing a pneumatic pressure having a precisely linear relation with respect to the differential pressure being measured. In large measure these difficulties stem from the fact that the normal range of movement of the parts is so small that it is difficult to reduce manufacturing tolerances to the point where all extraneous and undesirable forces are substantially eliminated so that acceptable linearity between differential pressure and pneumatic output pressure can be consistently achieved. Moreover dimensional changes in the parts due to variations in ambient temperature can become significant sources of error where such small operating movements are involved.

It is accordingly an object of the present invention to provide an improved differential-pressure-responsive device which is especially well adapted to be used in making a fluid flow measurement and in transmitting the measurement to a remotely located indicator, recorder or controller. It is another object of the invention to provide a differential-pressure-responsive device of the general type referred to above which provides more nearly precise proportionality between movement of the differential responsive diaphragm and pneumatic output pressure than has been achieved with prior devices. It is still another object of the present invention to provide a device of this type that is less subject to errors due to extraneous and undesirable forces. It is still another object of the invention to provide a device of this type that is less subject to errors due to variations in ambient temperature. Other objects of the invention will be in part obvious and in part pointed out hereafter.

The many objects and advantages of the present invention may best be understood and appreciated by reference to the accompanying drawings which illustrate a differential pressure transmitter incorporating a preferred embodiment of the present invention and wherein Fig. 1 is a perspective view showing the external appearance of the transmitter and the manner in which it can be mounted on a flow pipe;

Fig. 3 is a vertical section taken on the line 3—3 of Fig. 2 and showing in elevation one of the flexures of the flexure assembly that restrains axial movement of the force bar;

Fig. 4 is a vertical section taken on the line 4—4 of Fig. 2 and showing in elevation the other flexure of the flexure assembly and the baffle that forms part of the nozzle-baffle assembly of the pneumatic system;

Fig. 5 is a horizontal section taken on the line 5—5 of Fig. 2 and showing the relative lateral locations of the force bar, nozzle support and the adjustable spring that engages the lower end of the range adjusting lever;

Fig. 6 is a horizontal section taken on the line 6—6 of Fig. 2 and showing in plan view the top of the flexure assembly and the manner in which it engages the baffle of the nozzle-baffle assembly;

Fig. 7 is a fragmentary vertical section taken on the line 7—7 of Fig. 4 and particularly showing the mechanism for adjusting the mid-range position of the force bar;

Fig. 8 is a horizontal section taken on the line 8—8 of Fig. 2 showing further details of the sealed casing and the manner in which the differential pressure responsive diaphragm is connected to the force bar; and, Fig. 9 is a vertical section taken on the line 9—9 of Fig. 2 and showing the various ports and passages of the pneumatic relay supporting block.

Figure 2:
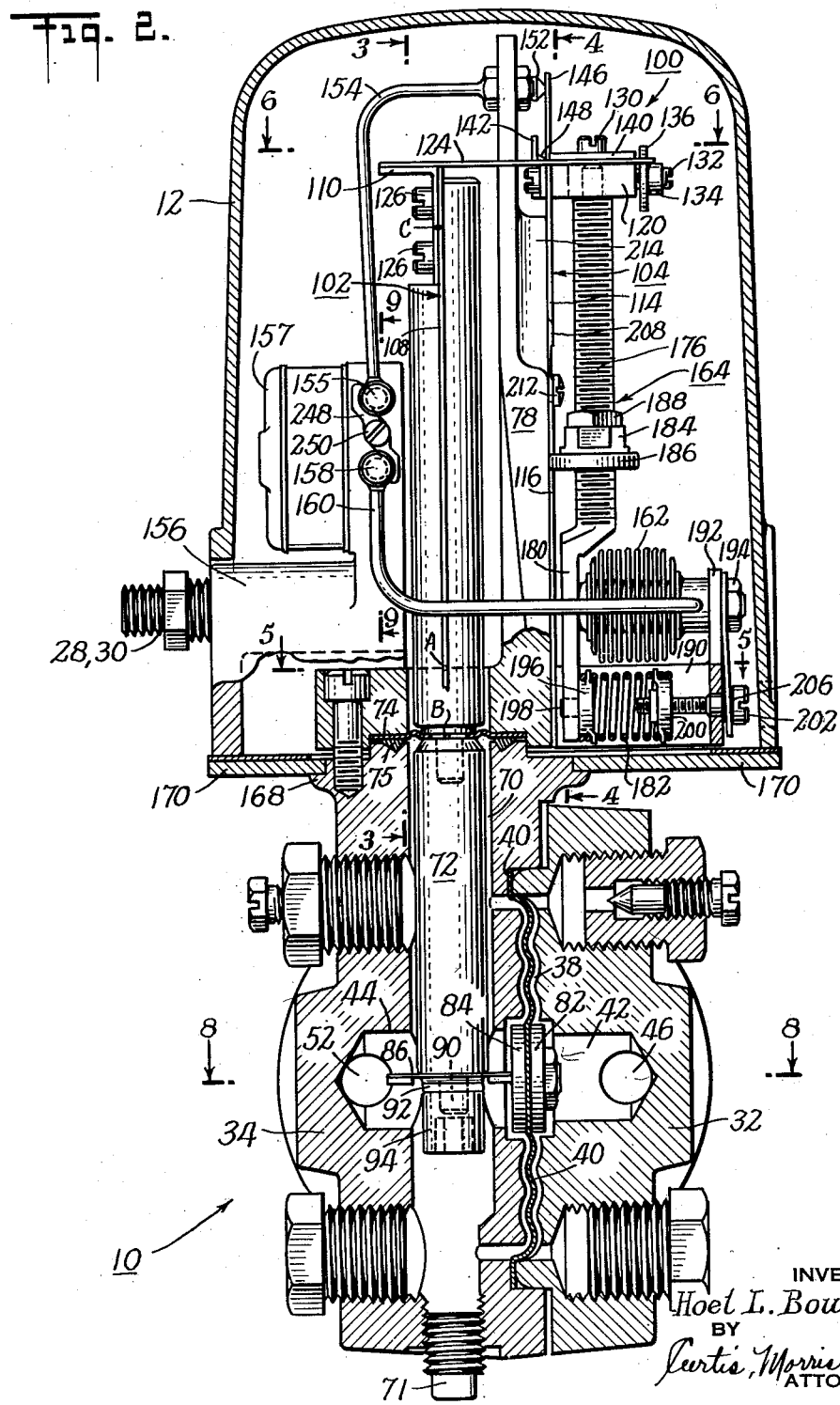
Fig. 2 is a vertical central section through the transmitter, on an enlarged scale, showing the general arrangement of the pressure-differential-responsive diaphragm, force bar and cooperating parts of the pneumatic system.

Referring to the drawings and more particularly to Fig. 1 the differential pressure transmitter comprises in general a lower hermetically sealed casing 10 which contains the differential pressure responsive diaphragm and an upper casing 12 that houses the external end of the force bar and the associated pneumatic system. As shown in Fig. 1 the transmitter can conveniently be mounted on a pipe 14 through which flows the liquid whose flow is to be measured. The pipe 14 is provided with an orifice plate 16 mounted between the flanges 18 and 20 in the usual manner to provide a pressure drop across the orifice that is a function of the fluid flow through the pipe.

The pressures upstream and downstream of the orifice are conducted to the casing 10 through the pipes 22 and 24 respectively. The casing 10 is provided with a by-pass valve 26, described in further detail hereafter, that can be opened to equalize the pressure on the two sides of the pressure responsive diaphragm when, for example, it is desired to adjust various parts of the transmitter. Compressed air to operate the transmitter is supplied from a suitable source through a pipe 28. The output pressure of the transmitter, which is a function of the flow through pipe 14, may be conducted from the transmitter through a pipe 30 to a suitable indicating, recording or controlling device (not shown) located at a point some distance from the transmitter.

The internal structure of the transmitter, and more particularly the structures of the sealed casing, flexure assembly and pneumatic system will now be described under separate headings, after which the operation of the device will be described and the significance of the novel structural features thereof explained.

The sealed casing

The sealed casing 10 is best shown in Figs. 1, 2 and 8 of the drawings. It is formed in two parts 32 and 34 which for convenience will be referred to respectively herein as the cover and body of the casing and which are bolted together by the bolts 36. Referring particularly to Figs. 2 and 8, mounted in a narrow recess 38 between the parts 32 and 34 of the casing there is a circular, convoluted, resilient diaphragm 40. The surfaces of the casing parts 32 and 34 confronting the diaphragm 40 are provided with convolutions corresponding to those of the diaphragm. These convoluted surfaces of the casing parts act as stops to limit deflections of the diaphragm.

Opposite the central portions of the diaphragm 40, the cover 32 and body 34 are provided with recesses 42 and 44 respectively that communicates at their adjacent ends with the recess 38 on opposite sides of diaphragm 40. At its outer end recess 42 communicates with a bore 46 that extends longitudinally through the cover 32. At one end (see particularly Fig. 8) the bore 46 communicates through an adapter 48 with the pipe 22 referred to above. At its opposite end bore 46 communicates with a passage 50 in the body of by-pass valve 26.

In like manner the recess 44 communicates with a bore 52 extending longitudinally through the body 34. At one end the bore 52 communicates through an adapter 54 with the pipe 24 leading to the flow pipe 14 and at its other end the bore 52 communicates with a passage 56 in the by-pass valve 26. The arrangement is such that the pressure upstream of the orifice 16 communicates through pipe 22, bore 46 and recess 42 with the right-hand side of the diaphragm 40 (as it is illustrated in Figs. 2 and 8) and the pressure downstream of the orifice communicates through pipe 24, bore 52 and recess 44 with the left-hand side of diaphragm 40. Hence the diaphragm is deflected in response to the difference between these two pressures.

Still referring to Fig. 8, the by-pass valve 26 is provided with a valve member 58 that is adapted to be moved axially by a rotation of the valve handle 60 (shown only in Fig. 1) to engage or be disengaged from the valve seat 62 and thereby prevent or provide communication between the passages 50 and 56 as desired.

Referring now particularly to Fig. 2, extending vertically through the body 34 of casing 10 there is a bore 70 that is plugged at its lower end by a plug 71. Extending through the bore 70 there is a force bar 72 which is secured, near the point at which it leaves body 34, to a resilient diaphragm 74. As indicated in Fig. 2 the force bar 72 can be conveniently made in two sections that are threaded together with the diaphragm 74 clamped therebetween. The diaphragm 74 rests on an annular gasket 75 located in a circular groove formed in the top of the body 34 and is held in place by the base 76 of a generally L-shaped nozzle support 78. More particularly the base 76 of support 78 rests on the peripheral portion of diaphragm 74 and is bolted to body 34 by thru bolts 80 (best shown in Fig. 5) in such manner that the diaphragm 74 is tightly clamped against the top of body 34.

Still referring to Fig. 2 the diaphragm 40 is connected to the lower end of force bar 72. More specifically the diaphragm 40 at its center is clamped between a pair of discs 82 and 84. To the disc 84 there is secured a connector 86 which as best shown in Fig. 8 has a U-shaped slot 88 formed therein. The force bar 72 has a threaded extension 90 of reduced diameter at its lower end that fits into the slot 88 of connector 86, and as shown in Fig. 2 the force bar is secured to the connector by means of a washer 92 and nut 94 that is threaded onto the extension 90 of the force bar and tightened up to make a firm connection between the diaphragm and force bar.

It is apparent that with the construction described deflection of the diaphragm 40 in response to differential pressure deflects the lower end of force bar 72 and the force bar pivots about an axis approximately in the plane of the resilient diaphragm 74 by which the force bar is supported. As an incident of this pivoting movement the top of force bar 72 is deflected somewhat in a direction opposite to that of the bottom of the force bar. As explained more fully hereafter the pneumatic system that cooperates with the force bar acts in such manner as to oppose the deflecting movement of the upper end of the force bar so that the actual pivoting movement of the force bar in normal operation is very small indeed.

The flexure assembly

In many cases the pressure within the casing 10 is substantially greater than atmospheric pressure and in such cases there is a tendency for the resilient diaphragm 74 to bulge upwardly, thereby moving the force bar 72 axially and changing the axis around which the bar pivots. Still referring to Fig. 2, to prevent this undesired axial movement of the force bar 72 the present device includes a flexure assembly 100 mounted within the upper casing 12. The construction and mounting of the flexure 100 is best shown in Figs. 3 to 6 of the drawings. It includes a flexure 102 (best shown in Fig. 3) and a flexure 104 (best shown in Fig. 4). The flexure 102 comprises a pair of flexible strips 106 and 108 that are secured together at their upper ends by the vertical portion of an angle plate 110 and at their lower ends are secured to the base 76 of the nozzle support 78 by means of the machine screws 112. In like manner the flexure 104 comprises a pair of flexible strips 114 and 116 that are bolted to the base 76 at their lower ends by the screws 118 and at their upper ends are secured to a block 120 by the screws 122 (see also Fig. 2). Referring to Fig. 5 as well as to Figs. 3 and 4, it will be noted that the bottom of each strip 106 and 108 is clamped between base 76 and a square clamping plate 117 so that there is a definite line along the top of the clamping plate below which the strip is fixed and above which the strip can flex. In the case of strips 114 and 116 this function is performed by the outwardly extending ears 191 of a U-shaped frame 190, the purpose of which is described hereafter.

Referring now to Fig. 2, the upper ends of the flexures 102 and 104 are interconnected by a plate or yoke 124. More particularly the yoke 124 is rigidly secured to the horizontal portion of angle plate 110 and adjustably secured to the block 120 in a manner described below. The vertical portion of angle piece 110 is secured to the top of force bar 72 by means of a pair of screws 126 in such manner that the flexures 102 straddles the force bar and as shown in Fig. 2 is substantially aligned with the longitudinal axis of the force bar.

It is evident that movement of the top of force bar 72 will produce a corresponding lateral movement of the upper end of the flexure assembly 100 and since the flexures 102 and 104 are rigidly secured to base 76 at their lower ends and are of equal length the yoke 124 will remain substantially horizontal as it moves laterally. Thus the flexures 102 and 104, the portion of base 76 between the flexures, and the yoke 124 can be conveniently described as a parallelogram flexure assembly.

The adjustable connection between block 120 and yoke 124 is best shown in Figs. 6 and 7 of the drawings. Referring particularly to Fig. 6 the portion of yoke 124 that overlies block 120 is provided with a pair of open-ended slots 128 within which are positioned the screws 130 that are threaded into block 120 in such manner that the screws hold the yoke 124 against block 120 but may be backed off to permit relative sliding movement of the yoke and block.

Referring to Fig. 7 the block 120 is provided with a screw 132 on which is threaded an adjusting nut 134 having a flange 136 that extends upwardly through a slot 138 in the yoke 124. The construction is such that when the screws 130 have been loosened, adjusting nut 134 can be rotated to produce relative movement of block 120 and yoke 124 and thereby vary the spacing between the upper ends of flexures 102 and 104. The purpose of this adjustment will be explained in connection with the description of the operation of the present device hereafter. As shown in Fig. 7 a cover plate 140 overlies the portion of yoke 124 that is in registry with block 120.

Reverting now to Fig. 6, the block 120 at its inner edge is provided with a baffle actuating strip 142 which is secured to block 120 by the screws 122 previously referred to. The strip 142 cooperates with a recess 144 formed in block 120 to define an opening through which the baffle 146 of the pneumatic system extends. The strip 142 is provided with a boss 148 that is adapted to engage the baffle. It may be noted that the yoke 124 is provided with a rather large central opening 150 through which the baffle 146 and nozzle support 78 extend. It will be apparent that with the structure described above, motion of the upper end of force bar 72 is transmitted through yoke 124, block 120 and baffle actuating strip 142 to the baffle 146.

The pneumatic system

The elements of the pneumatic system are best shown in Fig. 2 of the drawings. The pneumatic system includes a baffle-nozzle assembly comprising, in addition to the baffle 146 previously referred to, a nozzle 152 mounted in fixed position in the top of nozzle support 78. The nozzle 152 is connected by a tube 154 and a connector 155 to a relay supporting block 156 which supports a pneumatic relay 157. The details of construction of relay 157 form no part of the present invention and the relay may be for example of the type disclosed in Bowditch Patent No. 2,631,570. Relays of this type comprise a supply-and-waste valve and means for supplying a restricted flow of air to the nozzle of a baffle-nozzle assembly. Variations in the nozzle back pressure caused by relative movement of the nozzle and baffle are used to operate the supply-and-waste valve and thereby vary the relay output pressure. The relay 157 is supplied with compressed air from a suitable source through the pipe 28 (shown in Fig. 2) and a passage in block 156 described below. The relay output pressure communicates through passages in relay block 155 with pipe 30 (see also Fig. 1) and with connection 158 and a tube 160 which leads to an expansible bellows 162.

The pneumatic relay 157 and its supporting block 156 are mounted on the casing 10 independently of the mounting of the force bar and flexure assembly. Referring to Figs. 2 and 5 at the top of the body 34 of casing 10 there is formed an annular shoulder 168 that receives a plate 170 which in turn supports the relay block 156. As best shown in Fig. 5, the relay block 156 is provided with lateral flanges 171 by means of which it is secured to the body 34 with the screws 172 which pass through flanges 171 and plate 170 into body 34. The plate 170 also supports the upper casing 12 which is connected thereto by the screws 174 (see Fig. 5). The independent mounting of the relay 157 and its support is advantageous since it permits the pneumatic supply and discharge pipes to be connected to and disconnected from the relay block 156 without altering the relatively delicate adjustment of the force bar and flexure assembly.

The internal construction of the block 156 is indicated in Fig. 9 which is a vertical section through the block looking in the direction of relay 157. The supply air for operating the pneumatic system enters the block through pipe 28 as previously described and flows through a horizontal passage 220 extending under relay 157 and then upwardly through a passage 222 to a bore 224. A restricted amount of the supply air flows from bore 224 to the nozzle through passages 226 and 228, connector 155 and tube 154. An adjustable restrictor 230 is provided in bore 224 for regulating the flow of air to the nozzle. Unrestricted communication between bore 224 and the interior of relay 157 is established through a passage 232 (shown in dotted lines).

As previously described, the relay 157 operates in response to variations in the pressure back of nozzle 152. The nozzle back pressure communicates with relay 157 through a passage 234 which connects with passage 228. The relay output pressure enters block 156 through a passage 236 and communicates with both the interior of bellows 162 and the discharge pipe 30. More particularly passage 236 is connected by a short passage 238 with connector 158 and tube 160. Also passage 236 is connected through vertical passage 240 and horizontal passage 242 with pipe 30.

Connectors 155 and 158 are pressed into the passages 228 and 238 respectively with a press fit, O-ring gaskets 244 and 246 being provided on the two connectors respectively to ensure a tight fit. The connectors are held in place by a swingable clamping member 248 that is secured to block 156 by a screw 250 (see also Fig. 2).

As indicated above the relay output pressure is used to operate a pneumatic feed-back arrangement. Reverting to Fig. 2, the feed-back is obtained by conditioning the relay pressure through tube 160 to the expansible bellows 162 which bears against the lower end of a range adjusting lever or range rod 164 having an adjustable fulcrum. The range rod 164 transmits to the top of flexure 100 the force exerted by the bellows and also permits adjustment of the sensitivity of the instrument. Referring to both Fig. 2 and Fig. 7 the range rod 164 comprises a central threaded section 176 having at its upper end a knurled extension 178 of reduced diameter that extends into the block 120 with a force fit and thereby provides support for the range rod. At its lower end the range rod has a flattened portion 180 against which bears the bellows 162, previously referred to, and an adjustable spring 182. Adjustable along the threaded section 176 of the range rod there is an adjusting nut 184 having a circular flange 186 that bears against the nozzle-supporting column 78 and provides an adjustable fulcrum around which the range pivots. A lock nut 188 cooperates with the adjusting nut 184 to lock the adjusting nut against further rotation after it has been adjusted to the proper position. As explained hereafter in connection with the description of operation of the present device, the adjusting nut 184 provides a means whereby the sensitivity of the device can be adjusted.

Referring now also to Fig. 5 of the drawings the bellows 162 and springs 182 are supported on a generally U-shaped frame 190 that is secured to the base 76 of the nozzle support column by the screws 118. The frame 190 has an upwardly extending ear 192 (Fig. 2) to which the bellows 162 is secured by means of a nut 194. The spring 182 at its inner end is provided with an adapter 196 having a positioning pin 198 that engages a hole in the flattened portion 180 of range rod 164. At its other end spring 182 has an adapter 200 that receives an adjusting screw 202 mounted for rotation in the frame 190 and held against axial movement by a leaf spring 204, which is secured to frame 190 by the nut 194. The leaf spring 204 has a forked lower end that passes over a reduced section 206 of the screw 202. The construction is such that the screw 202 can be rotated to move adapter 200 axially and thereby vary the tension of spring 182. The function of this adjustable spring is pointed out below in the section describing the operation of the present device.

Referring to Fig. 4 the baffle 146 is made of a resilient material and is bifurcated to form two legs 208 and 210 that are secured at their lower ends to the nozzle support column 78 by means of screws 212. The legs 208 and 210 of baffle 146 straddle a portion 214 of the nozzle support column that provides a bearing surface for adjusting nut 184 when it is moved to the upper portion of range rod 164.

Operation

The general mode of operation of the present transmitter should be largely apparent from the foregoing description. The pressures upstream and downstream of the orifice 16 are conducted through pipes 22 and 24 and passages 46 and 52 in the sealed casing 10 to opposite sides of diaphragm 40. The resultant differential force on diaphragm 40 is transmitted by connector 86 to the lower end of range rod 72. Since the force bar 72 is arranged to pivot about an axis substantially in the plane of the diaphragm 74, the force exerted on the lower end of the force bar by the diaphragm 40 is transmitted through the force bar and a corresponding force is exerted by the upper end of the force bar on the parallelogram flexure 100. Since the flexure 100 engages baffle 146 variations in the differential pressure on diaphragm 40 tend to vary the position of baffle 146 with respect to nozzle 152.

The manner of operation of the nozzle-baffle assembly, relay 157 and feed-back bellows 162 is well known in the art and hence need not be described in detail herein. If the baffle 146 moves away from nozzle 152 the nozzle-back pressure drops, thus causing relay 157 to decrease the pressure in bellows 162. The resulting contraction of bellows 162 is transmitted through range rod 176 (which rocks around its adjustable fulcrum 184) to the flexure 100 and thus tends to cause the baffle 146 to move toward the nozzle. Similarly, if the baffle initially moves toward the nozzle a reaction is produced in the pneumatic system tending to move the baffle away from the nozzle. The net effect of these actions and reactions is that relay 157 produces in bellows 162 whatever pressure is necessary to maintain the baffle-nozzle assembly in its operative range, which as pointed out above is usually less than 0.001 inch. Since the upper end of force bar 72 is effectively connected to baffle 146, the pneumatic balancing system constrains the normal operating movement of the force bar to a very small range, i. e. a movement of the same order of magnitude as that of baffle 146.

The pressure developed in bellows 162 is also the output pressure of the transmitter and can be transmitted through pipe 30 as previously described to an indicating, recording or controlling instrument located at a remote point. Theoretically this output pressure should be precisely proportional to the differential pressure applied to diaphragm 40. However due to the fact that the parts have a very small range of movement it has been found difficult to reduce manufacturing tolerances to the point where significant departures from proportionality can be consistently avoided.

For example, referring to Fig. 2, it will be noted that the flexure 102 is substantially aligned with the central longitudinal axis of force bar 72. Let it be assumed that because of inaccuracies in the machining of the parts the center of the fixed mounting of the flexure 102 is laterally displaced a small amount, say 0.005 inch, with respect to the axis of the force bar 72. It has been previously pointed out that the pressure within casing 10 tends to cause diaphragms 74 to bulge upwardly. If there is a slight misalignment of the center of the mounting of flexure 102 and the central axis of the force bar as assumed, the upward thrust on diaphragm 74 and force bar 72 and the restraining force of flexure 102 will cooperate to produce a lateral force at the top of force bar 72 which will vary in accordance with variations in static pressure in the sealed casing 10 and that introduces an error into the operation of the instrument. The present transmitter so constructed as to compensate for a mis-alignment of this type.

In order to explain how such minor manufacturing inaccuracies are compensated for in the present device, the locations of the three geometrical points A, B and C in the device will now be defined. Referring to Figs. 2 and 3 and assuming the device is vertically arranged as shown in these figures point A is in a horizontal plane that defines the lower end of the effective portion of flexure 102, that is to say, below the plane containing point A the strips 106 and 108 of flexure 102 are fixed to the base 76 and above this plane they are flexible. It will be further noted that point A is at the center of the flexure 102, and in fact is within the body of the force bar, although for the assumed condition it is laterally spaced from the force bar axis by a small amount.

Referring particularly to Fig. 2, the point B is located at the center of diaphragm 74 and is on the central longitudinal axis of force bar 72. Point C is at the top of the force bar 72 where it is connected to flexure 102 and is also on the central longitudinal axis of the force bar.

It should be particularly noted that in the present device point A is located somewhat above point B. The advantage of providing such a spacing between points A and B is that if when the parts are assembled there is a slight mis-alignment between the flexure 102 and the force bar, the upper end of the force bar can be moved laterally to bring points A, B and C into precise alignment. In order to make the pneumatic output pressure of the device as nearly as possible precisely proportional to be measured differential pressure regardless of variations in the value of the static pressure within the casing, it is desirable that the position of the force bar, when points A, B and C are precisely aligned, correspond with the mid-range pressure of the pneumatic system. For example, if the pneumatic system has an effective operating range of from 3 to 15 lbs. per square inch it is desirable that the position of force bar 72 which produces precise alignment of points A, B and C correspond with a pneumatic pressure of 9 lbs. per square inch.

In the present device adjustments are provided to achieve this result. More specifically, the effective distance between the baffle 146 and the upper end of force bar 72 can be adjusted by rotation of adjusting nut 134 as previously described. It has been previously pointed out that the location of baffle 146 determines the position of the upper end of force bar 72. Hence when the adjusting nut 134 is rotated, the balancing force developed in the pneumatic system will increase or decrease to move the upper end of the force bar toward or away from the baffle 146. When the force bar has been moved to the position wherein points A, B and C are aligned, the screw 202 is adjusted as described below, if necessary, to bring the pressure to its mid-range value. By adjusting the device in this manner, first with the static pressure in the casing 10 at atmospheric and then at the maximum operating pressure, errors due to mis-alignment of this type are minimized, since they are equally distributed through the operating range of the device.

Still referring to Fig. 2, in the preferred embodiment of the present invention point A is located above point B but it is apparent that the same result can be achieved by locating point A a short distance below point B. It should be noted however that the spacing between points A and B should be a relatively small proportion of the length of the force rod. If for example, point A were spaced a substantial distance above point B the effective length of flexure 102 would be substantially less than the effective length of the upper end of the force bar. Hence as the force bar was pivoted during operation of the device, the circle described by the upper end of the flexure would have a substantially smaller radius than the circle described by the upper end of the force bar and the force bar would be pushed downwardly, thereby introducing another type of error into the operation of the device. In general it is desirable that point A be spaced above or below point B a sufficient distance so that points A, B and C can be precisely aligned to take care of normal manufacturing variations with a movement of the upper end of the force bar of no more than about 0.05 inch. Any greater spacing between points A and B is usually undesirable.

In addition to the foregoing adjustment which is provided near the top of flexure 100 to compensate for minor manufacturing inaccuracies, there are several other adjustments included in the present device. Thus the screw 202 provides a so-called "zero adjustment." As the screw 202 is rotated to vary the tension of spring 182, the pressure required in bellows 162 to produce a given balancing force at the top of force bar 72, also varies. Hence the screw 202 and spring 182 provide a means whereby, for example, the output pressure of the device can be adjusted with a given differential pressure e. g. zero differential pressure, across the diaphragm 40.

The adjustable nut 184 of range rod 176 provides for adjustment of the sensitivity of the device. As the nut is moved to the top of range rod 176 a larger change in pressure in bellows 162 is required to balance a given change in differential pressure, and consequently the device has a narrow proportioning band, which may also be called a high sensitivity. In like manner, if the nut 184 is located near the bottom of range rod 176, the device will have a wide proportioning band and a low sensitivity.

A further feature of the present structure that may be noted is the fact that the force bar, flexure assembly, range rod, and nozzle support are all located in mutually parallel relation. Hence the effect of variations in the lengths of these parts with changes in ambient temperature are largely cancelled out. In other words, the present structure is less subject to errors due to changes in ambient temperature.

It should be apparent from the foregoing description, that transmitters incorporating the present invention are capable of achieving the several objectives outlined at the beginning of the present specification. The mounting of the flexure somewhat above the diaphragm that supports the force bar and contains the pivoting axis of the force bar, taken together with the adjustment provided at the top of the flexure, provides an effective means of securing precise alignment of the flexure and force bar when these parts are mis-aligned due to minor manufacturing inaccuracies. At the same time the fixed mounting of the flexure is sufficiently close to the diaphragm to prevent substantial axial movement of the force bar as it is pivoted. The parallelogram flexure provides a convenient way for securing accurate horizontal transmission of the force exerted by the upper end of the force bar to the baffle of the nozzle-baffle assembly, while at the same time, permitting relative adjustment of the force bar and baffle. The relay is mounted on the casing independently of the force bar, flexure and pneumatic system so that strains imposed by connecting pipes to and disconnecting them from the device will not be transmitted to the relatively delicate force bar and flexure assembly to throw them out of adjustment. Also the force bar, the flexures of the flexure assembly, the range rod and the nozzle support are all arranged in substantially parallel relation, and hence the changes in the dimensions of the parts due to changes in the ambient temperature are largely neutralized, and temperature errors are minimized.

It is of course to be understood that the foregoing description is illustrative only and that numerous changes can be made in the specific embodiment described without departing from the spirit of the invention as defined in the appended claims.

I claim:

1. A pneumatic differential pressure transmitter comprising, in combination, a sealed casing having a resilient planar diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a flexure secured to said casing and to said force bar externally of said casing to inhibit axial movement of said force bar, and a pneumatic system including a nozzle-baffle assembly, a pneumatic relay and feed-back bellows mounted on said casing, said feed-back bellows being connected to the external portion of said force bar to exert thereon a force tending to balance the force exerted on the internal portion of said force bar by said differential pressure responsive means, the external portion of said force bar being connected to said nozzle-baffle assembly to produce relative movement of said nozzle and baffle to vary the output pressure of said relay and the pressure in said bellows, whereby a pressure is developed in said pneumatic system that is proportional to the measured differential pressure.

2. A pneumatic differential pressure transmitter comprising, in combination, a sealed casing having a resilient planar diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a flexure secured to said casing and to said force bar externally of said casing to inhibit axial movement of said force bar, the connection between said flexure and casing being located close to but slightly spaced from said force-bar-pivoting axis longitudinally of said force bar, and a pneumatic system including a nozzle-baffle assembly, pneumatic relay and feed-back bellows mounted on said casing, said feed-back bellows being connected to the external portion of said force bar to exert thereon a force tending to balance the force exerted on the internal portion of said force bar by said differential pressure responsive means, the external portion of said force bar being connected to said nozzle-baffle assembly to produce relative movement of said nozzle and baffle to vary the output pressure of said relay and the pressure in said bellows, whereby a pressure is developed in said pneumatic system that is proportional to the measured differential pressure, the connection between said force bar and nozzle-baffle assembly being provided with adjusting means for adjusting the relationship therebetween, whereby the force-bar-pivoting axis, the flexure-casing connection and the flexure-force bar connection can be precisely aligned with one another with a predetermined pressure value in said pneumatic system.

3. A pneumatic differential pressure transmitter comprising, in combination, a sealed casing having a resilient planar diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a flexure secured to said casing and to said force bar externally of said casing to inhibit axial movement of said force bar, the effective length of said flexure being slightly less than the effective length of the external portion of said force bar, and a pneumatic system including a nozzle-baffle assembly, pneumatic relay and feed-back bellows mounted on said casing, said feed-back bellows being connected to the external portion of said force bar to exert thereon a force tending to balance the force exerted on the internal portion of said force bar by said differential pressure responsive means, the external end of said force bar being connected to said baffle to produce relative movement of said nozzle and baffle to vary the output pressure of said relay and the pressure in said bellows, whereby a pressure is developed in said pneumatic system that is proportional to the measured differential pressure, the connection between said force bar and baffle being provided with adjusting means for adjusting the relationship therebetween, whereby the force-bar-pivoting axis, the flexure-casing connection and the flexure-force bar connection can be precisely aligned with one another with a predetermined pressure value in said pneumatic system.

4. A pneumatic differential pressure transmitter comprising, in combination, a sealed casing having a resilient planar diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a flexure secured to said casing and to said force bar externally of said casing to inhibit axial movement of said force bar, the connection between said flexure and casing being located close to but slightly spaced from said force-bar-pivoting axis longitudinally of said force bar, and a pneumatic system including a nozzle-baffle assembly, pneumatic relay and feed-back bellows mounted on said casing, said relay being mounted on said casing independently of said flexure, force bar, nozzle-baffle assembly and feed-back bellows, said feed-back bellows being connected to the external portion of said force bar to exert thereon a force tending to balance the force exerted on the internal portion of said force bar by said differential pressure responsive means, the external end of said force bar being connected to said nozzle-baffle assembly to produce relative movement of said nozzle and baffle to vary the output pressure of said relay and the pressure in said bellows, whereby a pressure is developed in said pneumatic system that is proportional to the measured differential pressure, the connection between said force bar and nozzle-baffle assembly being provided with adjusting means for adjusting the relationship therebetween, whereby the force-bar pivoting axis, the flexure-casing connection and the flexure-force bar connection can be precisely aligned with one another with a predetermined pressure value in said pneumatic system.

5. A pneumatic differential pressure transmitter comprising, in combination, a sealed casing having a resilient diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a flexure secured to said casing and to said force bar externally of said casing to inhibit axial movement of said force bar, the connection between said flexure and casing being located close to but slightly spaced from said force-bar-pivoting axis longitudinally of said force bar, and a pneumatic system including a nozzle-baffle assembly, pneumatic relay and feed-back bellows mounted on said casing, said feed-back bellows being connected to the external portion of said force bar to exert thereon a force tending to balance the force exerted on the internal portion of said force bar by said differential pressure responsive means, the external end of said force bar being connected to said nozzle-baffle assembly to produce relative movement of said nozzle and baffle to vary the output pressure of said relay and the pressure in said bellows, whereby a pressure is developed in said pneumatic system that is proportional to the measured differential pressure, the connection between said force bar and nozzle-baffle assembly being provided with adjusting means for adjusting the relationship therebetween, whereby the force-bar pivoting axis, the flexure-casing connection and the flexure-force bar connection can be precisely aligned with one another with a predetermined pressure value in said pneumatic system, and the connection between said force bar and feed-back bellows including a range-adjusting lever having an adjustable fulcrum and effectively connected at its ends to said force bar and bellows, whereby adjustment of said fulcrum varies the relation between changes in bellows pressure and changes in the measured differential pressure.

6. A pneumatic differential pressure transmitter according to claim 5 and wherein said range adjusting lever and said adjusting means are connected in series as a part of the connection between said force bar and bellows.

7. A pneumatic differential pressure transmitter comprising, in combination, a sealed casing having a resilient diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a parallelogram flexure assembly comprising a first and second inverted-U-shaped flexure effectively connected at their inner ends to said casing, said first flexure longitudinally straddling said force bar and being connected at substantially its midpoint with the external end of said force bar, said first and second flexures being substantially parallel and connected at their outer ends by an adjustable connection, and a pneumatic system including a nozzle-baffle assembly, pneumatic relay and feed-back bellows mounted on said casing, said feed-back bellows being connected through said flexure assembly to the external portion of said force bar to exert thereon a force tending to balance the force exerted on the internal portion of said force bar by said differential pressure responsive means, said second flexure being connected to said nozzle-baffle assembly to cause movement of said force bar to produce relative movement of said nozzle and baffle to vary the output pressure of said relay and the pressure in said bellows, whereby a pressure is developed in said pneumatic system that is proportional to the measured differential pressure, the adjustable connection between said first and second flexures being adjustable to permit precise alignment of the force-bar pivoting axis, the flexure-casing connection and the flexure-force bar connection with a predetermined pressure value in said pneumatic system.

8. A pneumatic transmitter according to claim 7 and including a range adjusting lever having an adjustable fulcrum, the ends of said lever being connected to said second flexure and said bellows whereby adjustment of the fulcrum of said lever varies the relation between changes in bellows pressure and changes in the measured differential pressure.

9. A pneumatic transmitter according to claim 8 and wherein the force bar, the first and second flexures and the range rod are mounted in mutually parallel relation to minimize the effect of changes in their dimensions due to variations in ambient temperature.

10. A pneumatic differential pressure transmitter comprising, in combination, a sealed casing having a resilient planar diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a flexure secured to said casing and to said force bar externally of said casing to inhibit axial movement of said force bar, the connection between said flexure and casing being located close to but slightly spaced from said force-bar-pivoting axis longitudinally of said force bar, a pneumatic balancing system connected to said force bar externally of said casing and operative to exert on said force bar a force tending to balance the force exerted on the internal portion of said force bar by said differential pressure responsive means, and adjusting means interposed between said force bar and said pneumatic balancing system, said adjusting means being adjustable to permit precise alignment of the force-bar-pivoting axis, the flexure-casing connection and the flexure-force bar connection with a predetermined pressure value in said pneumatic system.

11. A pneumatic differential pressure transmitter comprising, in combination, a sealed casing having a resilient planar diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a flexure secured to said casing and to said force bar externally of said casing to inhibit axial movement of said force bar, and a pneumatic system including a nozzle-baffle assembly, pneumatic relay and feed-back bellows mounted on said casing, said relay being mounted on said casing independently of said force bar, flexure, bellows and nozzle-baffle assembly, said feed-back bellows being connected to the external portion of said force bar to exert thereon a force tending to balance the force exerted on the internal portion of said force bar by said differential pressure responsive means, the external portion of said force bar being connected to said nozzle-baffle assembly to produce relative movement of said nozzle and baffle to vary the output pressure of said relay and the pressure in said bellows, whereby a pressure is developed in said pneumatic system that is proportional to the measured differential pressure.

12. A pneumatic differential pressure transmitter comprising, in combination, a sealed casing having a resilient diaphragm forming part of the wall thereof, a force bar extending through said resilient diaphragm and secured thereto whereby said force bar has an internal portion within said casing and an external portion outside said casing, differential pressure responsive means mounted in said casing and connected to said force bar therein to pivot it about an axis approximately in the plane of said resilient diaphragm in response to variations in the differential pressure to be measured, a flexure secured to said casing and to said force bar externally of said casing to inhibit axial movement of said force bar, a pneumatic system including a nozzle-baffle assembly, pneumatic relay and feed-back bellows mounted on said casing, said feed-back bellows being connected to the external portion of said force bar to exert thereon a force tending to balance the force exerted on the internal portion of said force bar by said differential pressure responsive means, the external portion of said force bar being connected to said nozzle-baffle assembly to produce relative movement of said nozzle and baffle to vary the output pressure of said relay and the pressure in said bellows, whereby a pressure is developed in said pneumatic system that is proportional to the measured differential pressure, and a range-adjusting lever having an adjustable fulcrum and forming part of the connection between said bellows and said force bar, whereby adjustment of said fulcrum varies the relation between changes in bellows pressure and changes in the measured differential pressure.

13. A pneumatic transmitter according to claim 12 and wherein the force bar, flexure and range-adjusting lever are all arranged in mutually parallel relation to minimize the effect of changes in dimensions due to variations in ambient temperature.

14. In differential pressure responsive apparatus in combination, a sealed casing having a first resilient diaphragm mounted therein, said casing being provided with ports whereby the opposite sides of said diaphragm can be placed in communication with two different pressures, said casing also having a second resilient diaphragm forming part of the wall thereof, a force bar extending through said second diaphragm and secured thereto, the portion of said force bar within the said casing being connected to said first diaphragm whereby movement of said first diaphragm in response to variation in the differential pressure causes said force bar to pivot about an axis approximately in the plane of said second diaphragm, a generally U-shaped flexure comprising a pair of resilient arms effectively connected at their ends to the exterior of said casing on opposite sides of said force bar, said flexure extending outwardly from said casing along said force bar and said force bar being connected to the mid-point of said flexure, the distance between the point of connection of said force bar and flexure and the point of connection of said flexure and casing being approximately the same as the distance between said force bar-flexure connection and said second resilient diaphragm, whereby axial movement of said force bar due to pressure in said casing is substantially avoided as said force bar is pivoted by movement of said first diaphragm.

15. In differential pressure responsive apparatus, in combination, a sealed casing having a resilient diaphragm forming part of the wall thereof, a force bar extending through said resilient diaphragm and secured thereto, differential pressure responsive means mounted in said casing and connected to said force bar therein to pivot it about an axis approximately in the plane of said diaphragm in response to variations in the differential pressure to be measured, a generally U-shaped flexure comprising a pair of resilient arms effectively connected at their ends to the exterior of said casing on opposite sides of said force bar, said flexure extending outwardly from said casing along said force bar and said force bar being connected to the mid-point of said flexure, the distance between the point of connection of said force bar and flexure and the point of connection of said flexure and casing being slightly less than the distance between said force bar-flexure connection and said resilient diaphragm whereby axial movement of said force bar due to pressure in said casing is substantially avoided as said force bar is pivoted by said differential pressure responsive means.

16. In differential pressure responsive apparatus, in combination, a sealed casing having a resilient diaphragm forming part of the wall thereof, a force bar extending through said resilient diaphragm and secured thereto, differential pressure responsive means mounted in said casing and connected to said force bar therein to pivot it about an axis approximately in the plane of said resilient diaphragm in response to variations in the differential pressure to be measured, and a parallelogram flexure assembly comprising a first and second inverted U-shaped flexure, said first and second flexures being connected to said casing at their inner ends, said first flexure being positioned to straddle longitudinally said force bar and being connected at substantially its mid-point with the external end of said force bar, said first and second flexures being substantially parallel and interconnected at their outer ends, and the effective length of said flexure assembly being approximately the same as the effective length of the external portion of said force bar, whereby axial movement of said force bar as it is pivoted by said differential pressure responsive means is avoided.

17. In a differential pressure responsive apparatus, in combination, a sealed casing having a resilient planar diaphragm forming part of the wall thereof, a force bar extending through said resilient diaphragm and secured thereto whereby said force bar has an internal portion within said casing and an external portion outside said casing, differential pressure responsive means mounted in said casing and connected to said internal portion of said force bar to pivot said force bar about an axis approximately in the plane of said resilient diaphragm in response to variations in the differential pressure to be measured, and a flexure secured to said casing and to the external portion of said force bar to inhibit axial movement of said force bar, the effective length of said flexure being slightly less than the effective length of the external portion of said force bar.

18. A pneumatic differential pressure transmitter comprising, in combination, a sealed casing having a resilient planar diaphragm forming part of the wall thereof, a force bar extending through said resilient diaphragm and secured thereto, whereby said force bar has an internal portion within said casing and an external portion outside said casing, differential pressure responsive means mounted in said casing and connected to the internal portion of said force bar to pivot said force bar about an axis approximately in the plane of said resilient diaphragm in response to variations in the differential pressure to be measured, a flexure secured to said casing and to said external portion of said force bar to inhibit axial movement of said force bar, and a pneumatic balancing system connected to said external portion of said force bar and operative to exert on said external portion a force tending to balance the force exerted on the internal portion of said force bar by said differential pressure responsive means.

References Cited in the file of this patent

UNITED STATES PATENTS

| | | |
|---|---|---|
| 1,992,048 | Temple | Feb. 19, 1935 |
| 2,431,200 | Rosenberger | Nov. 18, 1947 |
| 2,612,908 | Tate | Oct. 7, 1952 |
| 2,638,911 | Griswold | May 19, 1953 |
| 2,658,392 | Vannah | Nov. 10, 1953 |